US011353987B2

United States Patent
Liu et al.

(10) Patent No.: US 11,353,987 B2
(45) Date of Patent: Jun. 7, 2022

(54) VOLTAGE COMPENSATION METHOD, VOLTAGE COMPENSATION DEVICE AND TOUCH DISPLAY MODULE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Rui Liu, Beijing (CN); Gaowei Chen, Beijing (CN); Junjie Xu, Beijing (CN); Yanming Wang, Beijing (CN); Jiaqiang Wang, Beijing (CN); Chao Yu, Beijing (CN); Dong Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 337 days.

(21) Appl. No.: 16/478,716

(22) PCT Filed: Dec. 27, 2018

(86) PCT No.: PCT/CN2018/124228
§ 371 (c)(1),
(2) Date: Jul. 17, 2019

(87) PCT Pub. No.: WO2019/174359
PCT Pub. Date: Sep. 19, 2019

(65) Prior Publication Data
US 2021/0365171 A1 Nov. 25, 2021

(30) Foreign Application Priority Data

Mar. 15, 2018 (CN) .......................... 201810214404.9

(51) Int. Cl.
*G06F 3/044* (2006.01)
*G09G 3/36* (2006.01)
*G06F 3/041* (2006.01)

(52) U.S. Cl.
CPC ........ *G06F 3/04166* (2019.05); *G06F 3/0412* (2013.01); *G09G 3/36* (2013.01);
(Continued)

(58) Field of Classification Search
CPC .. G06F 3/04166; G06F 3/0412; G06F 3/0446; G09G 3/36; G09G 3/3648;
(Continued)

(56) References Cited

U.S. PATENT DOCUMENTS 6,034,908 A * 3/2000 Becker ................ G11C 7/1051
365/189.05
2002/0138159 A1* 9/2002 Atkinson .............. G06F 1/3203
700/21

(Continued)

OTHER PUBLICATIONS

Extended European Search Report for European Application No. 18899025.3-1210, dated Nov. 15, 2021, 33 Pages.

Primary Examiner — Julie Anne Watko
(74) Attorney, Agent, or Firm — Brooks Kushman P.C.

(57) ABSTRACT

A voltage compensation method includes: within a touch time period, multiplexing common electrode blocks as touch electrodes, and scanning the common electrode blocks in at least one column sequentially to detect a capacitance of each scanned common electrode block; within a time period between detecting the capacitance of each scanned common electrode block and starting an $N^{th}$ display time period after the touch time period, calculating power consumption for each scanned common electrode block in accordance with the capacitance thereof, acquiring a corresponding common electrode voltage compensation value based on the power consumption, and adding the common electrode voltage
(Continued)

compensation value to a reference common electrode voltage to acquire a compensated common electrode voltage applied to each scanned common electrode block; and within the $N^{th}$ display time period, adjusting a common electrode voltage applied to each scanned common electrode block into the compensated common electrode voltage.

20 Claims, 5 Drawing Sheets

(52) U.S. Cl.
CPC ....... *G09G 3/3648* (2013.01); *G09G 2310/08* (2013.01); *G09G 2320/0233* (2013.01); *G09G 2320/0285* (2013.01); *G09G 2320/041* (2013.01); *G09G 2330/021* (2013.01); *G09G 2360/16* (2013.01)

(58) Field of Classification Search
CPC ....... G09G 2310/08; G09G 2320/0233; G09G 2320/0285; G09G 2320/041; G09G 2330/021; G09G 2360/16
See application file for complete search history.

(56) References Cited

U.S. PATENT DOCUMENTS

2013/0329057 A1    12/2013   Al-Dahle et al.
2015/0338961 A1    11/2015   Lee

\* cited by examiner

VOLTAGE COMPENSATION METHOD, VOLTAGE COMPENSATION DEVICE AND TOUCH DISPLAY MODULE

CROSS-REFERENCE TO RELATED APPLICATIONS

This application is the U.S. national phase of PCT Application No. PCT/CN2018/124228 filed on Dec. 27, 2018, which claims priority to Chinese Patent Application No. 201810214404.9 filed on Mar. 15, 2018, which are incorporated herein by reference in their entireties.

TECHNICAL FIELD

The present disclosure relates to the field of voltage compensation technology, in particular to a voltage compensation method, a voltage compensation device, and a touch display module.

BACKGROUND

For a Touch and Display Driver Integration (TDDI) module, a common electrode layer includes a plurality of common electrode blocks arranged independent of each other in an array form, and each common electrode block may be multiplexed as a touch electrode. However, in the conventional TDDI module, at a display stage, different common electrode blocks have different loads, so liquid crystals in different columns are deflected in different degrees, resulting in such a phenomenon as Mura (uneven brightness) in a vertical direction.

SUMMARY

In one aspect, the present disclosure provides in some embodiments a voltage compensation method, including: within a touch time period, enabling a plurality of common electrode blocks arranged independent of each other in an array form to be multiplexed as touch electrodes respectively, and scanning the common electrode blocks in at least one column sequentially to detect a capacitance of each scanned common electrode block; within a time period between a time point where the capacitance of each scanned common electrode block has been detected and a time point where an $N^{th}$ display time period after the touch time period starts, calculating power consumption for each scanned common electrode block in accordance with the capacitance of each scanned common electrode block, acquiring a corresponding common electrode voltage compensation value in accordance with the power consumption for each scanned common electrode block, and adding the common electrode voltage compensation value to a reference common electrode voltage to acquire a compensated common electrode voltage applied to each scanned common electrode block, N being a positive integer: and within the $N^{th}$ display time period, adjusting a common electrode voltage applied to each scanned common electrode block into the compensated common electrode voltage.

In a possible embodiment of the present disclosure, the calculating the power consumption for each scanned common electrode block in accordance with the capacitance of each scanned common electrode block includes calculating the power consumption for each scanned common electrode block through a formula $P=CUs^2$, where P represents the power consumption for the scanned common electrode block, C represents the capacitance of the scanned common electrode block, and Us represents an initial common electrode voltage applied to the scanned common electrode block within a display time period before the $N^{th}$ display time period.

In a possible embodiment of the present disclosure, the acquiring the corresponding common electrode voltage compensation value in accordance with the power consumption for each scanned common electrode block includes: acquiring a table indicating a correspondence between the power consumption and the common electrode voltage compensation values; and acquiring the corresponding common electrode voltage compensation value in the table in accordance with the power consumption for each scanned common electrode block.

In a possible embodiment of the present disclosure, the voltage compensation method further includes: within a testing period, applying the reference common electrode voltage to all the common electrode blocks, and detecting a display region average brightness value for the common electrode blocks in at least one column at a testing grayscale; comparing the display region average brightness value for the common electrode blocks in at least one column with a standard brightness value, and when a difference between the display region average brightness value for the common electrode blocks in at least one column and the standard brightness value is greater than a brightness threshold, incrementing or decrementing the common electrode voltage applied to each of the common electrode blocks in at least one column by a step voltage value, until the difference between the display region average brightness value for the common electrode blocks in at least one column and the standard brightness value is smaller than or equal to the brightness threshold; and recording the common electrode voltage compensation value corresponding to the common electrode blocks in at least one column, applying a touch scanning signal to the common electrode blocks in at least one column to detect a capacitance of one of the common electrode blocks in at least one column, calculating the power consumption for the common electrode block in accordance with the capacitance, and recording a mapping relationship between the power consumption and the common electrode voltage compensation value, so as to generate the table.

In a possible embodiment of the present disclosure, the table is stored in an external server. The acquiring the corresponding common electrode voltage compensation value in accordance with the power consumption for each scanned common electrode block further includes, upon the receipt of table modification information, acquiring the table from the external server, modifying the table in accordance with the table modification information to acquire a modified table, and transmitting the modified table to the external server, so as to update the table stored in the external server as the modified table.

In a possible embodiment of the present disclosure, the table includes a first table and a second table. The acquiring the table indicating the correspondence between the power consumption and the common electrode voltage compensation values includes: acquiring an ambient temperature; and comparing the ambient temperature with a temperature threshold, acquiring the first table when the ambient temperature is greater than or equal to the temperature threshold, and acquiring the second table when the ambient temperature is smaller than the temperature threshold.

In a possible embodiment of the present disclosure, subsequent to adjusting the common electrode voltage applied to each scanned common electrode block into the compensated common electrode voltage within the $N^{th}$ display time period, the voltage compensation method further includes, within a display time period between the $N^{th}$ display time period and an Nth display time period after a next touch time period adjacent to the touch time period, maintaining the common electrode voltage applied to each scanned common electrode block as the compensated common electrode voltage.

In another aspect, the present disclosure provides in some embodiments a voltage compensation device, including: a touch circuit configured to, within a touch time period, enable a plurality of common electrode blocks arranged independent of each other in an array form to be multiplexed as touch electrodes respectively, and scan the common electrode blocks in at least one column sequentially; a capacitance detection circuit configured to detect a capacitance of each scanned common electrode block; a compensated common electrode voltage calculation circuit configured to, within a time period between a time point where the capacitance of each scanned common electrode block has been detected and a time point where an $N^{th}$ display time period after the touch time period starts, calculate power consumption for each scanned common electrode block in accordance with the capacitance of each scanned common electrode block, acquire a corresponding common electrode voltage compensation value in accordance with the power consumption for each scanned common electrode block, and add the common electrode voltage compensation value to a reference common electrode voltage to acquire a compensated common electrode voltage applied to each scanned common electrode block, N being a positive integer: and a compensation circuit configured to, within the $N^{th}$ display time period, adjust a common electrode voltage applied to each scanned common electrode block into the compensated common electrode voltage.

In a possible embodiment of the present disclosure, the compensated common electrode voltage calculation circuit includes: a power consumption calculation sub-circuit configured to calculate the power consumption for each scanned common electrode block in accordance with the capacitance of each scanned common electrode block; a common electrode voltage compensation value acquisition sub-circuit configured to acquire the corresponding common electrode voltage compensation value in accordance with the power consumption for each scanned common electrode block; and a summation sub-circuit configured to add the common electrode voltage compensation value to the reference common electrode voltage to acquire the compensated common electrode voltage applied to each scanned common electrode block.

In a possible embodiment of the present disclosure, the power consumption calculation sub-circuit is further configured to calculate the power consumption for each scanned common electrode block through a formula $P=CUs^2$, where P represents the power consumption for the scanned common electrode block, C represents the capacitance of the scanned common electrode block, and Us represents an initial common electrode voltage applied to the scanned common electrode block within a display time period before the $N^{th}$ display time period.

In a possible embodiment of the present disclosure, the common electrode voltage compensation value acquisition sub-circuit is further configured to acquire a table indicating a correspondence between the power consumption and the common electrode voltage compensation values, and acquire the corresponding common electrode voltage compensation value in the table in accordance with the power consumption for each scanned common electrode block.

In a possible embodiment of the present disclosure, the voltage compensation device further includes a table generation circuit. The table generation circuit includes a common electrode voltage application sub-circuit, an average brightness acquisition sub-circuit, a brightness comparison sub-circuit and a correspondence recording sub-circuit. The common electrode voltage application sub-circuit is configured to, within a testing period, apply the reference common electrode voltage to all the common electrode blocks. The average brightness acquisition sub-circuit is configured to, within the testing period, detect a display region average brightness value for the common electrode blocks in at least one column at a testing grayscale. The brightness comparison sub-circuit is connected to the average brightness calculation sub-circuit and configured to, within the testing period, compare the display region average brightness value for the common electrode blocks in at least one column with a standard brightness value, transmit a voltage adjustment signal to the common electrode voltage application sub-circuit when a difference between the display region average brightness value for the common electrode blocks in at least one column and the standard brightness value is greater than a brightness threshold, so as to enable the common electrode voltage application sub-circuit, upon the receipt of the voltage adjustment signal, increment or decrement the common electrode voltage applied to each of the common electrode blocks in at least one column by a step voltage value until the difference between the display region average brightness value for the common electrode blocks in at least one column and the standard brightness value is smaller than or equal to the brightness threshold, and transmit a recording control signal to the corresponding recording sub-circuit. The correspondence recording sub-circuit is connected to the brightness comparison sub-circuit, and configured to, within the testing period and upon the receipt of the recording control signal, record the common electrode voltage compensation value corresponding to the common electrode blocks in at least one column, apply a touch scanning signal to the common electrode blocks in at least one column to detect a capacitance of one of the common electrode blocks in at least one column, calculate the power consumption for the common electrode block in accordance with the capacitance, and record a mapping relationship between the power consumption and the common electrode voltage compensation value, so as to generate the table.

In a possible embodiment of the present disclosure, the table is stored in an external server. The compensated common electrode voltage calculation circuit further includes a table adjustment sub-circuit connected to the external server, and configured to, upon the receipt of table modification information, acquire the table from the external server, modify the table in accordance with the table modification information to acquire a modified table, transmit the modified table to the external server, and update the table stored in the external server as the modified table.

In a possible embodiment of the present disclosure, the table includes a first table and a second table. The compensated common electrode voltage calculation circuit further includes a temperature acquisition sub-circuit and a temperature determination sub-circuit. The temperature acquisition sub-circuit is configured to acquire an ambient temperature. The temperature determination sub-circuit is connected to the temperature acquisition sub-circuit and the common electrode voltage compensation value acquisition sub-circuit, and configured to compare the ambient temperature with a temperature threshold, transmit a first control signal to the common electrode voltage compensation value acquisition sub-circuit when the ambient temperature is greater than or equal to the temperature threshold, and transmit a second control signal to the common electrode voltage compensation value acquisition sub-circuit when the ambient temperature is smaller than the temperature threshold. The common electrode voltage compensation value acquisition sub-circuit is further configured to acquire the first table upon the receipt of the first control signal, and acquire the second table upon the receipt of the second control signal.

In a possible embodiment of the present disclosure, the voltage compensation device further includes a temperature detector configured to detect the ambient temperature. The temperature acquisition sub-circuit is further configured to acquire the ambient temperature from the temperature detector.

In a possible embodiment of the present disclosure, the compensation circuit is further configured to, within a display time period between the $N^{th}$ display time period and an Nth display time period after a next touch time period adjacent to the touch time period, maintain the common electrode voltage applied to each scanned common electrode block as the compensated common electrode voltage.

In yet another aspect, the present disclosure provides in some embodiments a touch display module includes a common electrode layer and the above-mentioned voltage compensation device. The common electrode layer includes a plurality of common electrode blocks arranged independent of each other in an array form. The plurality of common electrode blocks is multiplexed as touch electrodes respectively. The voltage compensation device is configured to apply a compensated common electrode voltage to each common electrode block.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
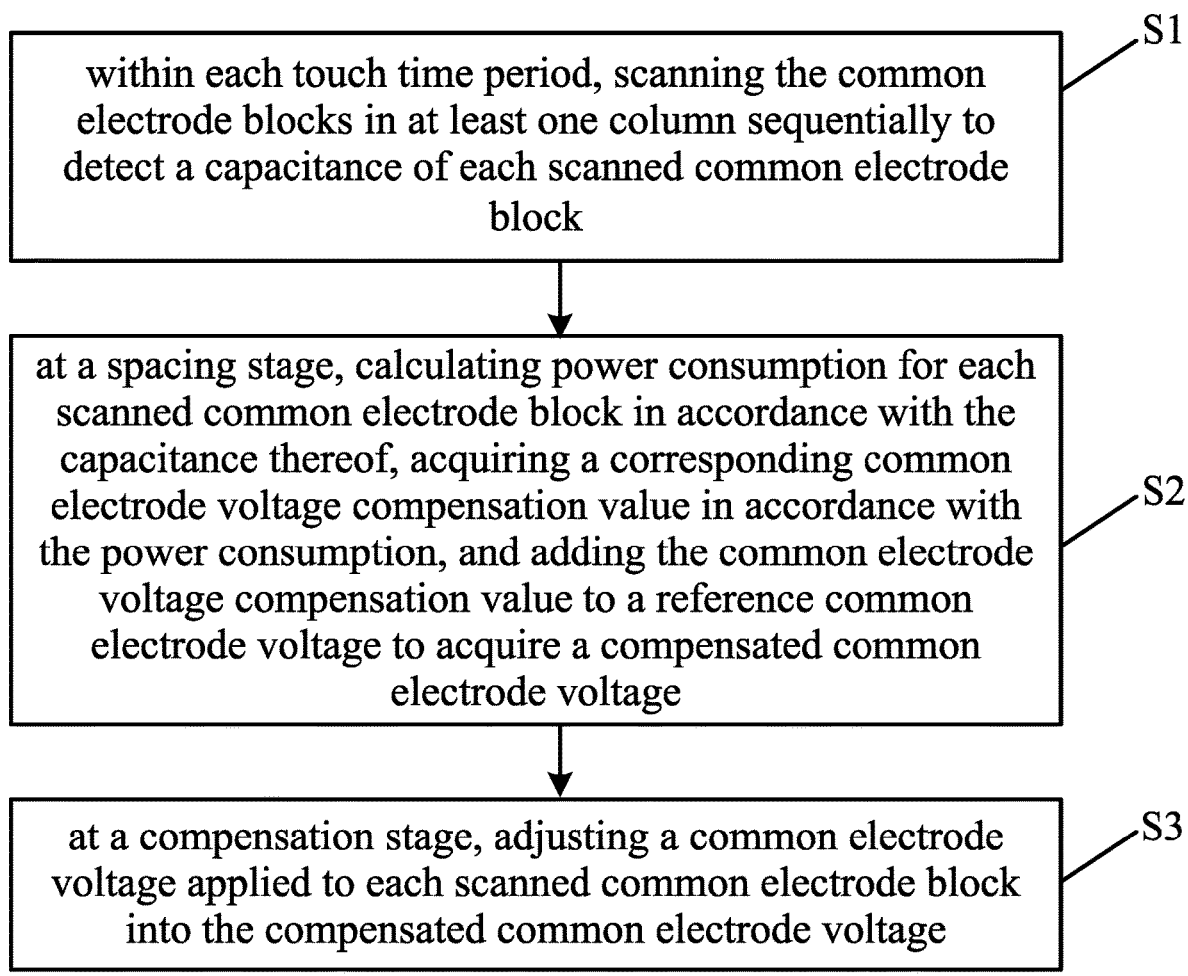
FIG. 1 is a flow chart of a voltage compensation method according to one embodiment of the present disclosure.
Figure 2:
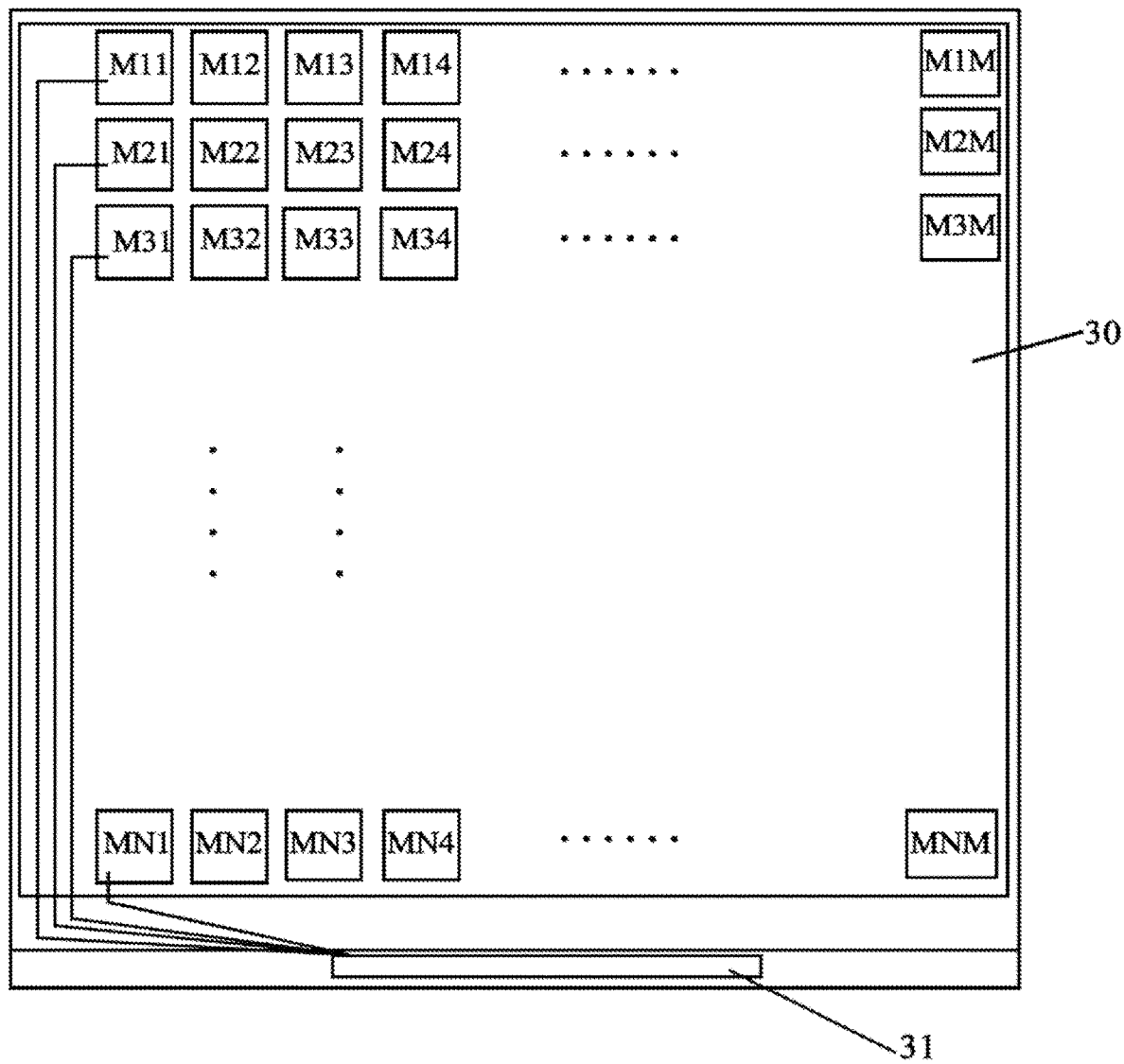
FIG. 2 is a schematic view showing a touch display module to which the voltage compensation method is applied according to one embodiment of the present disclosure.

The present disclosure provides in some embodiments a voltage compensation method for use in a touch display module. The touch display module includes a common electrode layer, the common electrode layer includes a plurality of common electrode blocks arranged independent of each other in an array form (as shown in FIG. 2), and each common electrode block is multiplexed as a touch electrode. A driving period of the touch display module includes touch time periods and display time periods arranged alternately. As shown in FIG. 1, the voltage compensation method includes: S1 of, within each touch time period, scanning the common electrode blocks in at least one column sequentially to detect a capacitance of each scanned common electrode block; S2 of, at a spacing stage, calculating power consumption for each scanned common electrode block in accordance with the capacitance of each scanned common electrode block, acquiring a corresponding common electrode voltage compensation value in accordance with the power consumption for each scanned common electrode block, and adding the common electrode voltage compensation value to a reference common electrode voltage to acquire a compensated common electrode voltage; and S3 of, at a compensation stage, adjusting a common electrode voltage applied to each scanned common electrode block into the compensated common electrode voltage. The compensation stage is an $N^{th}$ display time period following the touch time period, where N is a positive integer. The spacing stage is a time period between a time point where the capacitance of each scanned common electrode block has been detected and a time point where the compensation stage starts.

According to the voltage compensation method in the embodiments of the present disclosure, the capacitance of each of the scanned common electrode blocks in at least one column may be detected within the touch time period (each common electrode block may be multiplexed as a mutually-capacitive touch electrode), the corresponding power consumption may be calculated in accordance with the capacitance, and then the common electrode voltage may be compensated at the compensation stage (i.e., the display time period subsequent to the touch time period). As a result, it is able to prevent the occurrence of display defects.

In actual use, the power consumption for the common electrode block is associated with a load of the common electrode block, and the load of the common electrode block is associated with the common electrode voltage applied to the common electrode block. Hence, there is a correspondence between the power consumption for the common electrode block and the common electrode voltage applied to the common electrode block, which will be described hereinafter.

To be specific, N may be 1, and the $N^{th}$ display time period may be a display time period immediately subsequent to the touch time period; or N may be 2, and the $N^{th}$ display time period may be a second display time period subsequent to the touch time period; or N may be 3, and the $N^{th}$ display time period may be a third display time period subsequent to the touch time period.

In actual use, it may take time to detect the capacitance of each scanned common electrode block, calculate the power consumption for the common electrode block in accordance with the capacitance and acquire the common electrode voltage compensation value in accordance with the power consumption. When the time is relatively long, N may be an integer greater than 1.

During the implementation, the touch time period may include at least one touch stage. The step of, within the touch time period, scanning the common electrode blocks in at least one column sequentially may include, at a corresponding touch stage, applying a touch scanning signal to each common electrode block in a corresponding column, and receiving a touch sensing signal from each scanned common electrode block in the corresponding column.

In actual use, at the touch stage of the touch time period, the touch scanning signal may be applied to each common electrode block in a corresponding column, and then the touch sensing signal may be received from each scanned common electrode block, so as to determine whether there is a touch operation in accordance with the touch sensing signal.

During the implementation, when a common electrode block is touched by a finger, a capacitance of the touched common electrode block may be greater than a capacitance of the common electrode block which has not been touched yet. Regardless of a reporting situation (where the common electrode block has been touched) and a non-reporting situation (where the common electrode block has not been touched), the common electrode voltage may be compensated in accordance with the capacitance of the common electrode detected actually.

To be specific, the step of calculating the power consumption for the common electrode block in accordance with the capacitance may include calculating the power consumption for the common electrode block through a formula $P=CU_s^2$, where P represents the power consumption for the scanned common electrode block, C represents the capacitance of the scanned common electrode block, and Us represents an initial common electrode voltage applied to the scanned common electrode block within a display time period before the compensation stage.

In actual use, the common electrode voltage may be applied by a driving Integrated Circuit (IC) to each common electrode block, and Us may be just the initial common electrode voltage applied by the driving IC to the common electrode block within the display time period when the common electrode voltage compensation has not been performed yet.

The deduction of the formula $P=CU_s^2$ will be described hereinafter in conjunction with equivalent diagrams.

To be specific, during the detection of the capacitance of the scanned common electrode block, charge quantity information about the common electrode block may be calculated in accordance with the touch sensing signal from the scanned common electrode block, and then the capacitance of the common electrode block may be calculated in accordance with the charge quantity information.

In actual use, the capacitance of each scanned common electrode block may be detected in accordance with the charge quantity information about the common electrode block, and the charge quantity information may be acquired in accordance with the touch sensing signal from the common electrode block.

During the implementation, within the touch time period, a modulation signal may be applied to all the common electrode blocks which have not been scanned yet, and the modulation signal may be the same as the touch scanning signal.

In actual use, when the modulation signal same as the touch scanning signal is applied to all the common electrode blocks which have not been scanned yet within the touch time period, it is able to apply the same touch scanning signal to all the common electrode blocks of the entire touch screen. When a touch sensing signal different from the touch scanning signal is fed back from the touched common electrode block, it is able to observe the touch sensing signal in a more intuitive manner.

To be specific, the step of acquiring the corresponding common electrode voltage compensation value in accordance with the power consumption may include: acquiring a predetermined table indicating a correspondence between the power consumption and the common electrode voltage compensation values; and acquiring the corresponding common electrode voltage compensation value in the table in accordance with the power consumption.

In actual use, the corresponding common electrode voltage compensation value may be acquired in the predetermined table in accordance with the power consumption.

To be specific, the voltage compensation method may further include, within a testing period of the touch display module: applying the reference common electrode voltage to all the common electrode blocks of the touch display module, and detecting a display region average brightness value for the common electrode blocks in at least one column at a predetermined grayscale (also called as a testing grayscale); comparing the display region average brightness value for the common electrode blocks in at least one column with a standard brightness value, and when a difference between the display region average brightness value for the common electrode blocks in at least one column and the standard brightness value is greater than a predetermined brightness difference (also called as a brightness threshold), incrementing or decrementing the common electrode voltage applied to each of the common electrode blocks in at least one column by a step voltage value, until the difference between the display region average brightness value for the common electrode blocks in at least one column and the standard brightness value is smaller than or equal to the predetermined brightness difference; and recording the common electrode voltage compensation value corresponding to the common electrode blocks in at least one column, applying the touch scanning signal to the common electrode blocks in at least one column to detect a capacitance of one of the common electrode blocks in at least one column, calculating the power consumption for the common electrode block in accordance with the capacitance, and recording a mapping relationship between the power consumption and the common electrode voltage compensation value, so as to generate the table.

During the implementation, the display region average brightness value for the common electrode blocks in at least one column may be just an average brightness value of a display region corresponding to the common electrode blocks in at least one column.

In actual use, a common electrode voltage in the table initially used may be the reference common electrode voltage. A touch display panel may be divided into a plurality of display regions, and each display region may correspond to the common electrode blocks in at least one column of the touch display module (depending on the practical need, one display region may correspond to the common electrode blocks in one column or at least two columns). An average brightness value of each display region of the touch display panel may be tested through an optical testing device. The common electrode voltage applied to the common electrode block at a display region with uneven brightness may be incremented or decremented by a step voltage value, until the display region average brightness value for the display region meets the requirement. In actual use, the step voltage value may be 0.0025V, and the reference common electrode voltage may be −0.25V.

In actual use, the table may be stored in an external server. To be specific, when the touch display module is a mobile phone, the external server may be a mainboard system of the mobile phone. The step of, at the spacing stage, calculating the power consumption for each scanned common electrode block in accordance with the capacitance of each scanned common electrode block, acquiring the corresponding common electrode voltage compensation value in accordance with the power consumption for each scanned common electrode block, and adding the common electrode voltage compensation value to the reference common electrode voltage to acquire the compensated common electrode voltage may further include, upon the receipt of table modification information, acquiring the table from the external server, modifying the table in accordance with the table modification information to acquire a modified table, and transmitting the modified table to the external server, so as to update the table stored in the external server as the modified table.

In actual use, the table modification information may be inputted by a user.

During the implementation, the table may be modified in accordance with the table modification information inputted by the user. To be specific, the table modification information may be inputted by the user, the table acquired from the external server may be modified in accordance with the table modification information so as to acquire the modified table, and then the modified table may be transmitted to the external server, so as to replace the original table stored in the external server with the modified table.

During the implementation, a dielectric constant of a liquid crystal may change along with a temperature, and the capacitances of the common electrode blocks may be different at different temperatures, so different tables may be provided with respect to different temperature ranges.

In a possible embodiment of the present disclosure, the table may include a first table and a second stale. The acquiring the table indicating the correspondence between the predetermined power consumption and the common electrode voltage compensation values may include: acquiring an ambient temperature of the touch display module; and comparing the ambient temperature with a temperature threshold, acquiring the first table when the ambient temperature is greater than or equal to the temperature threshold, and acquiring the second table when the ambient temperature is smaller than the temperature threshold.

In actual use, the table may include the first table corresponding to a normal-temperature state and the second table corresponding to a low-temperature state. The ambient temperature of the touch display module may be acquired (e.g., through a temperature detector), and then the ambient temperature may be compared with the temperature threshold (the temperature threshold may be set according to the practical need, e.g., it may be, but not limited to, −10° C. depending on common knowledge in the art). When the ambient temperature is greater than or equal to the temperature threshold, the first table may be acquired, and when the ambient temperature is smaller than the temperature threshold, the second table may be acquired.

The table acquired as mentioned above may be modified after Mura in a vertical direction is determined through human eyes or instrument. In addition, a load of a transmission line is seriously affected by the ambient temperature.

The first table may be used at a normal temperature, and the second table may be used at a low temperature, so as to optimize a display effect.

In a possible embodiment of the present disclosure, the quantity of the first tables corresponding to the normal-temperature state may be one.

In another possible embodiment of the present disclosure, the quantity of the first tables corresponding to the normal-temperature state may be at least two, and each first table may correspond to one normal temperature range, so as to further optimize a compensation effect.

For example, when the temperature threshold is −10° C., the quantity of the first tables may be three. A first one of the three first tables may correspond to a first normal temperature range, a second one of the three first tables may correspond to a second normal temperature range, and a third one of the three first tables may correspond to a third normal temperature range. The first normal temperature range may be greater than or equal to −10° C. and smaller than 0° C., the second normal temperature range may be greater than or equal to 0° C. and smaller than 15° C., and the third normal temperature range may be greater than or equal to 15° C.

In a possible embodiment of the present disclosure, the quantity of the second tables corresponding to the low-temperature state may be one.

In another possible embodiment of the present disclosure, the quantity of the second tables corresponding to the normal-temperature state may be at least two, and each second table may correspond to one low temperature range, so as to further optimize the compensation effect.

For example, when the temperature threshold is −10° C., the quantity of the second tables may be two. A first one of the two second tables may correspond to a first low temperature range, and a second one of the two second tables may correspond to a second low temperature range. The first low temperature range may be greater than or equal to −30° C. and smaller than −10° C., and the second low temperature range may be greater than or equal to −10° C. and smaller than or equal to 15° C.

During the implementation, subsequent to S3 of, at the compensation stage, adjusting the common electrode voltage applied to each scanned common electrode block into the compensated common electrode voltage calculated in accordance with the capacitance, the voltage compensation method may further include, within a display time period between the compensation stage and a next compensation stage, maintaining the common electrode voltage applied to each scanned common electrode block as the compensated common electrode voltage.

In actual use, within the display time period between the current compensation stage and a next compensation stage, the common electrode voltage applied to the common electrode block may be maintained.

The voltage compensation method will be described hereinafter in conjunction with a specific embodiment.

As shown in FIG. 2, the voltage compensation method may be applied to a touch display module, and the touch display module may include a common electrode layer arranged on a display panel 30. The common electrode layer may include a plurality of common electrode blocks arranged independent of each other in N rows and M columns, and each common electrode block may be multiplexed as a touch electrode, where N and M are each a positive integer.

In FIG. 2, M11 represents a common electrode block in a first row and a first column, M21 represents a common electrode block in a second row and the first column, M31 represents a common electrode block in a third row and the first column, and MN1 represents a common electrode block in an $N^{th}$ row and the first column.

M12 represents a common electrode block in the first row and a second column, M22 represents a common electrode block in the second row and the second column, M32 represents a common electrode block in the third row and the second column, and MN2 represents a common electrode block in the $N^{th}$ row and the second column.

M13 represents a common electrode block in the first row and a third column, M23 represents a common electrode block in the second row and the third column, M33 represents a common electrode block in the third row and the third column, and MN3 represents a common electrode block in the $N^{th}$ row and the third column.

M14 represents a common electrode block in the first row and a fourth column, M24 represents a common electrode block in the second row and the fourth column, M34 represents a common electrode block in the third row and the fourth column, and MN4 represents a common electrode block in the $N^{th}$ row and the fourth column.

M1M represents a common electrode block in the first row and an $M^{th}$ column, M2M represents a common electrode block in the second row and the $M^{th}$ column, M3M represents a common electrode block in the third row and the $M^{th}$ column, and MNM represents a common electrode block in the $N^{th}$ row and the $M^{th}$ column.

In FIG. 2, 31 represents the driving IC. Each common electrode block may be connected to the driving IC 31 via a corresponding touch line (i.e., a common electrode voltage line). The touch line may be arranged at a source-drain (SD) metal layer, and arranged at a same layer as data lines. In order to prevent the occurrence of a short circuit caused when the touch lines intersect the data lines, at a region below a display panel 30 and adjacent to the driving IC 31, each touch line may extend from the SD layer to a gate metal layer (which has a relatively large resistance) in a span-over manner, and then connected to the driving IC 31 at either side of the driving IC 31. At this time, the touch lines at a fan-out region may have different lengths (as well as different resistances and capacitances), so the common electrode voltages applied through different touch lines may be different from each other greatly within the display time period, and thereby the loads of different common electrode blocks may be different from each other too. As a result, the liquid crystals in different columns may be deflected at different degrees when an image is displayed, i.e., there may exist Mura (uneven brightness) in the vertical direction.

FIG. 2 merely illustratively shows the touch lines connected to the common electrode blocks in the first column.

For the touch display module in FIG. 2, the common electrode blocks may be scanned column by column. To be specific, there may exist various scanning modes, e.g., the common electrode blocks may be scanned column by column from left to right, or from both sides to center, or in any other appropriate scanning mode, which will not be particularly defined herein.

Figure 3:
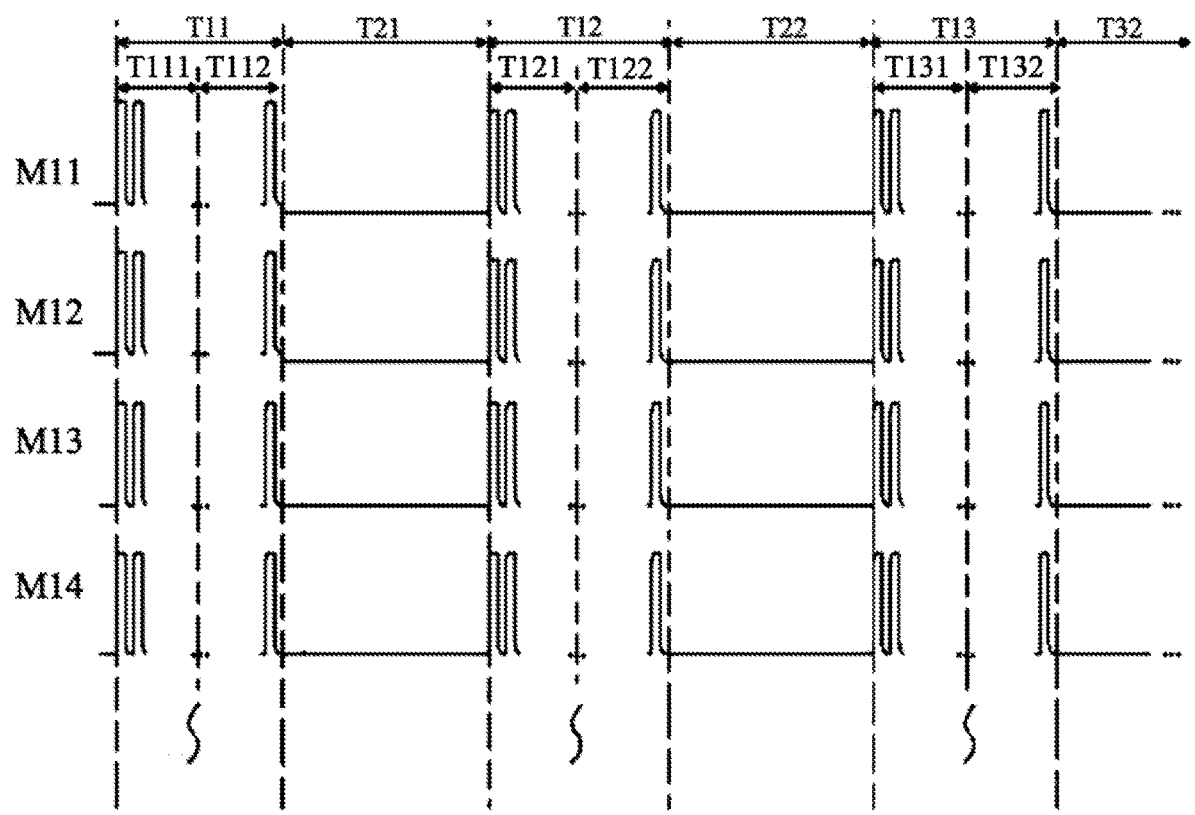
FIG. 3 is a time sequence diagram of signals applied by M11, M12, M13 and M14 in FIG. 2.

As shown in FIG. 3, the driving period of the touch display module may include a first touch time period T11, a first display time period T21, a second touch time period T12, a second display time period T22, a third touch time period T13 and a third display time period T23 in sequence. In actual use, subsequent to the third display time period T23, the driving period may further include the other touch time periods and display time periods arranged alternately, which however are not shown in FIG. 3.

At a first touch section T111 of the first touch time period, the common electrode blocks in the first column (in a direction from left to right) may be scanned (merely a signal applied to the common electrode block M11 in the first row and the first column is shown in FIG. 3), so as to detect the capacitances of all the common electrode blocks in the first column. At T111, apart from the common electrode blocks in the first column, the modulation signal may be applied to the other common electrode blocks, and the modulation signal may be the same as the touch scanning signal. In addition, at T111, a touch circuit may merely receive the touch sensing signal from the common electrode blocks in the first column, and the touch scanning signal may be a high-frequency pulse signal.

At a second touch section T112 of the first touch time period T11, the common electrode blocks in the second column may be scanned (merely a signal applied to the common electrode block M12 in the first row and the second column is shown in FIG. 3), so as to detect the capacitances of all the common electrode blocks in the second column. At T112, apart from the common electrode blocks in the second column, the modulation signal may be applied to the other common electrode blocks, and the modulation signal may be the same as the touch scanning signal. In addition, at T112, the touch circuit may merely receive the touch sensing signal from the common electrode blocks in the second column.

Within the first display time period T21, during a display driving operation, the power consumption for each common electrode block in the common electrode blocks in the first column may be calculated in accordance with the capacitance of the common electrode block, the power consumption for each common electrode block in the common electrode blocks in the second column may be calculated in accordance with the capacitance of the common electrode block, the corresponding common electrode voltage compensation value may be acquired in accordance with the power consumption, and then the common electrode voltage compensation value may be added to the predetermined reference common electrode voltage so as to acquire the compensated common electrode voltage. The power consumption P for the common electrode block may be calculated in accordance with the capacitance C of the common electrode block through the formula $P=C \times Us^2$ (the deduction of the formula will be described hereinafter in conjunction with the equivalent diagrams), where Us represents an initial common electrode voltage applied by the driving IC to the common electrode block within the display time period when no common electrode voltage compensation is performed. Within the first display time period T21, the common electrode voltage applied to the common electrode blocks in the first column and the second column may still be the reference common electrode voltage.

At a first touch section T121 of the second touch time period T12, the common electrode blocks in the third column (in a direction from left to right) may be scanned (merely a signal applied to the common electrode block M13 in the first row and the third column is shown in FIG. 3), so as to detect the capacitances of all the common electrode blocks in the third column. At T121, apart from the common electrode blocks in the third column, the modulation signal may be applied to the other common electrode blocks, and the modulation signal may be the same as the touch scanning signal. In addition, at T121, a touch circuit may merely receive the touch sensing signal from the common electrode blocks in the third column, and the touch scanning signal may be a high-frequency pulse signal.

At a second touch section T122 of the second touch time period T12, the common electrode blocks in the fourth column may be scanned (merely a signal applied to the common electrode block M14 in the first row and the fourth column is shown in FIG. 3), so as to detect the capacitances of all the common electrode blocks in the fourth column. At T122, apart from the common electrode blocks in the fourth column, the modulation signal may be applied to the other common electrode blocks, and the modulation signal may be the same as the touch scanning signal. In addition, at T122, the touch circuit may merely receive the touch sensing signal from the common electrode blocks in the fourth column.

Within the second display time period T22, during the display driving operation, the common electrode voltage applied to all the common electrode blocks in the first column may be adjusted into the corresponding compensated common electrode voltage calculated in accordance with the corresponding capacitance, and the common electrode voltage applied to all the common electrode blocks in the second column may be adjusted into the corresponding compensated common electrode voltage calculated in accordance with the corresponding capacitance.

In addition, within the second display time period T22, during the display driving operation, the power consumption for each common electrode block in the common electrode blocks in the third column may be calculated in accordance with the capacitance of the common electrode block, the power consumption for each common electrode block in the common electrode blocks in the fourth column may be calculated in accordance with the capacitance of the common electrode block, the corresponding common electrode voltage compensation value may be acquired in accordance with the power consumption, and then the common electrode voltage compensation value may be added to the predetermined reference common electrode voltage so as to acquire the compensated common electrode voltage.

Within the third display time period T32, during the display driving operation, the common electrode voltage applied to all the common electrode blocks in the third column may be adjusted into the corresponding compensated common electrode voltage calculated in accordance with the corresponding capacitance, and the common electrode voltage applied to all the common electrode blocks in the fourth column may be adjusted into the corresponding compensated common electrode voltage calculated in accordance with the corresponding capacitance.

In addition, within the third display time period T32, during the display driving operation, the power consumption for each common electrode block in the common electrode blocks in the fifth column (not shown in FIG. 2) may be calculated in accordance with the capacitance of the common electrode block, the power consumption for each common electrode block in the common electrode blocks in the sixth column (not shown in FIG. 2) may be calculated in accordance with the capacitance of the common electrode block, the corresponding common electrode voltage compensation value may be acquired in accordance with the power consumption, and then the common electrode voltage compensation value may be added to the predetermined reference common electrode voltage so as to acquire the compensated common electrode voltage.

In FIG. 3, T131 represents a first touch section of the third touch time period T13, and T132 represents a second touch section of the third touch time period T13.

In order to prevent the occurrence of uneven brightness at the display region caused when different common electrode blocks have different loads, as compared with the related art where a single common electrode voltage VCOM is applied within the display time period of the TDDI product, in the embodiments of the present disclosure, the VCOM compensation may be performed on common electrode blocks at different regions in accordance with the loads of the common electrode blocks. As a result, it is able to adjust a display effect of a display panel in a more accurate manner. In addition, it is able to prevent, to some extent, the occurrence of afterimage due to different common electrode voltages applied to the common electrode blocks at different regions, thereby to improve the display effect.

In the embodiments of the present disclosure, a scheme for compensating the VCOM on a region basis has been provided for the TDDI product. In this scheme, the different reference capacitances of different common electrode blocks may be determined within the touch time period, and then the VCOM compensation may be performed in accordance with different capacitances, so as to improve the display effect. In addition, it is able to prevent the occurrence of Mura caused when the common electrode blocks have different transmission loads after the quantity of used mask plates is reduced. Furthermore, the driving IC using the scheme may be applied to a display panel which is manufactured through fewer mask plates, so as to reduce the manufacture cost and improve the yield.

In the embodiments of the present disclosure, the loads of different common electrode blocks may be calculated in accordance with the capacitances thereof as is known in the related art, and it is unnecessary to provide any additional calculation circuit, so it is able to simplify the driving IC.

In the embodiments of the present disclosure, the voltage compensation method may be applied to a panel which includes a layer of gate metal lines and a layer of source-drain metal lines and which is manufactured through fewer mask plates, so it is able to reduce the manufacture cost of a Liquid Crystal Display (LCD) product, thereby to improve the market competitiveness thereof.

The deduction of the formula for calculating the power consumption P for the common electrode block in accordance with the capacitance C of the common electrode block will be described as follows.

Figure 4A:
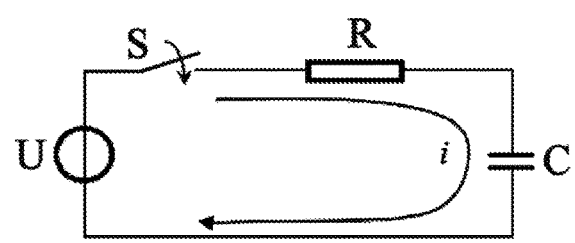
FIG. 4A is a schematic view showing an RC loop.

For an RC loop (as shown in FIG. 4A, it may include a switch S, a resistor R, a capacitor C and a power source U), when the switch S is switched on, the capacitor C may receive a rising edge signal. At this time, an instantaneous alternating current i flowing through the RC loop (as shown in FIG. 4A) may be calculated through the following equation $$i = C \cdot \frac{dUc(t)}{dt},$$

where t represents a time, and Uc(t) represents a voltage across the capacitor $$C \cdot R \cdot C \cdot \frac{dUc(t)}{dt} + Uc(t) = Us,$$

where Us represents an initial common electrode voltage applied by the driving IC to the common electrode block within the display time period when no common electrode voltage compensation is performed.

Based on the above equations, the following equations may be acquired:

$$Uc(t) = C \cdot e^{\int \frac{1}{RC} dt} + e^{-\int \frac{1}{RC} dt} \cdot \int \frac{Us}{RC} \cdot e^{\int \frac{1}{RC} dt},$$

and $Uc(t) = C \cdot e^{-\frac{1}{RC} dt} + Us.$

An initial condition, i.e., t=0 and Uc=0, may be assigned to the above equations, so as to acquire the following equation:

$$Uc(t) = -Us \cdot e^{-\frac{1}{RC} dt} + Us.$$

In a word, on a transmission path, the power consumption P of the resistor R and the capacitor C may be calculated through the following equation: $P=\int_0^\infty U_S i dt = CU_S^2$.

Based on the above deduction, the power consumption P of the RC loop may be determined in accordance with the capacitance C of the RC loop and Us, and the power consumption P may be independent of the resistance of the RC loop.

In the above equation, Us represents an initial common electrode voltage applied by the driving IC to the common electrode block within the display time period when no common electrode voltage compensation is performed.

For the RC loop, $P=CUs^2$, so the larger the power consumption for the RC loop is, the larger the coupling capacitance C is. A relationship between the voltage Uc(t) across the capacitor C and the time t may be represented by the following equation:

$$Uc(t) = Us - Us \cdot e^{-\frac{1}{RC} dt}.$$

For the RC loop having a larger capacitance C, it may take a longer time to acquire a same voltage.

Figure 4B:
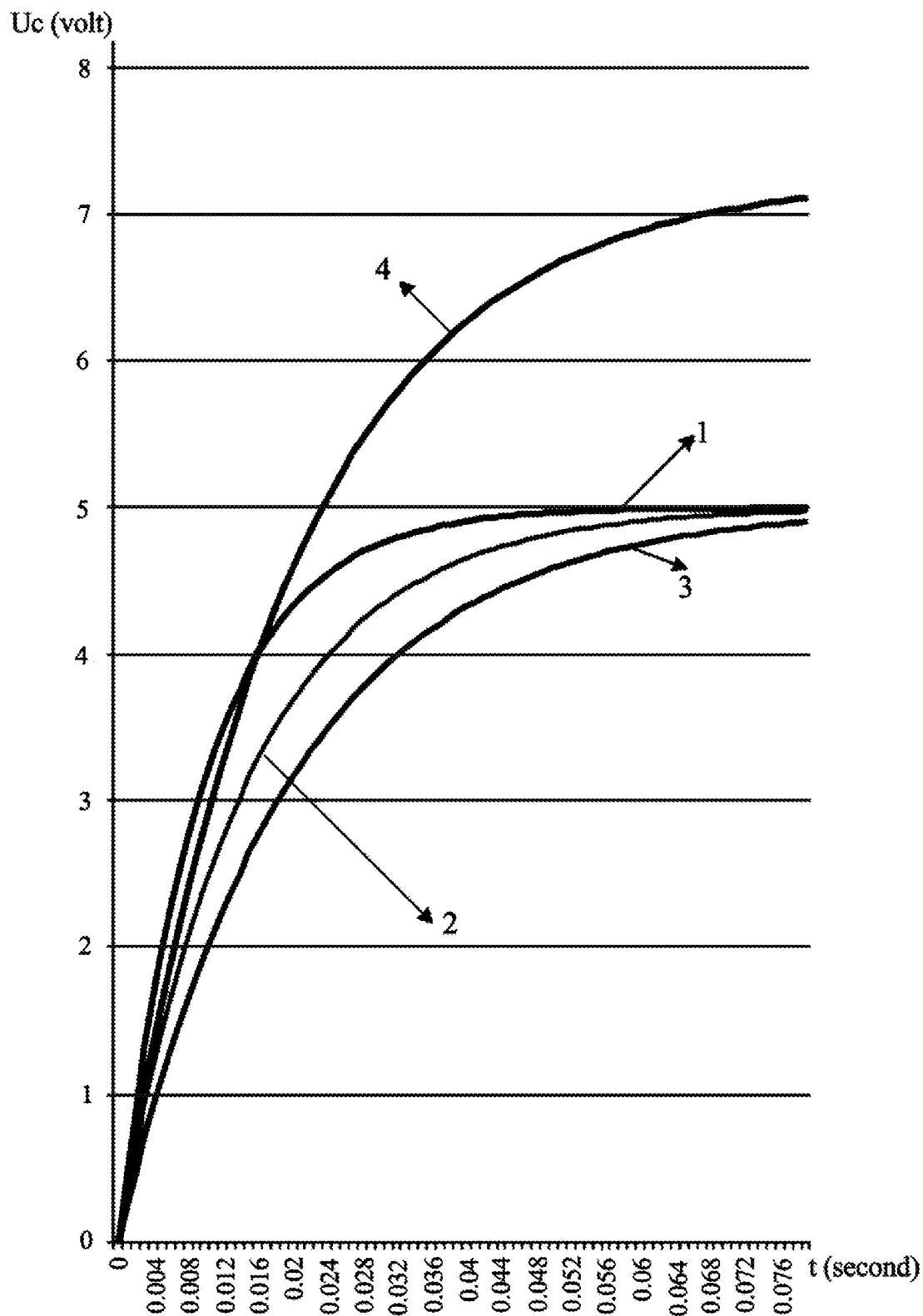
FIG. 4B is a curve diagram showing a relationship between Uc(t) corresponding to different capacitances C in the RC loop in FIG. 4A and a time t.

For example, for the RC loop in FIG. 4A, U=5V, and R=1KΩ. When the capacitances of the capacitors C in three RC loops are 10 μF, 15 μF and 20 μF respectively, relationships between the voltages Uc(t) across the capacitors C and the time t are shown in FIG. 4B. In FIG. 4B, an x-axis represents the time t with a unit of second, and a y-axis represents the voltage Uc(t) across each capacitor with a unit of V.

In FIG. 4B, curve 1 represents a relationship between Uc(t) and t when the capacitance of the capacitor C is 10 μF, curve 2 represents a relationship between Uc(t) and t when the capacitance of the capacitor C is 15 μF, curve 3 represents a relationship between Uc(t) and t when the capacitance of the capacitor C is 20 μF, and curve 4 represents a relationship between Uc(t) and t when Us has been adjusted and the capacitance of the capacitor C is 20 μF (Us is adjusted from 5V to 7.25V).

As shown in FIG. 4B, for the RC loop having a large capacitance, it may take a long time for the common electrode voltage applied to the common electrode block to reach 4V. However, when Us is increased to 7.25V (i.e., the common electrode voltage compensation value is 3.25V), the time taken for Uc(t) to reach 4V when C is 20 μF may be the same as the time taken for Uc(t) to reach 4V when C is 10 μF. Hence, there is a correspondence between the power consumption for the RC loop and the common electrode voltage compensation values.

In FIG. 4B, the common electrode voltage compensation value is 3.25V. However, in actual use, a step voltage value is usually 0.0025V, so the actual common electrode voltage compensation value may be relatively small.

The present disclosure further provides in some embodiments a voltage compensation device for use in a touch display module. The touch display module includes a common electrode layer. The common electrode layer includes a plurality of common electrode blocks arranged independent of each other in an array form (as shown in FIG. 2), and each common electrode block is multiplexed as a touch electrode. A driving period of the touch display module includes touch time periods and display time periods arranged alternately.

Figure 5:
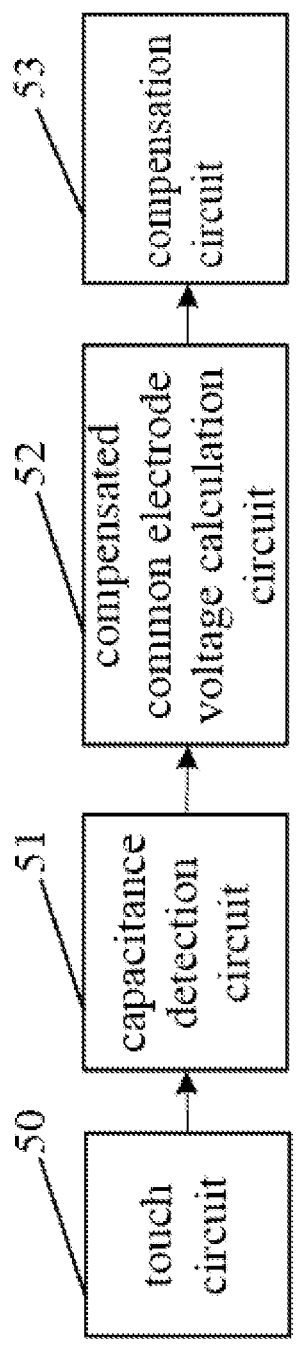
FIG. 5 is a schematic view showing a voltage compensation device according to one embodiment of the present disclosure.

As shown in FIG. 5, the voltage compensation device includes: a touch circuit 50 configured to, within the touch time period, scan the common electrode blocks in at least one column sequentially; a capacitance detection circuit 51 configured to detect a capacitance of each scanned common electrode block; a compensated common electrode voltage calculation circuit 52 configured to, at a spacing stage, calculate power consumption for each scanned common electrode block in accordance with the capacitance of each scanned common electrode block calculated by the capacitance detection circuit 51, acquire a corresponding common electrode voltage compensation value in accordance with the power consumption for each scanned common electrode block, and add the common electrode voltage compensation value to a predetermined reference common electrode voltage to acquire a compensated common electrode voltage; and a compensation circuit 53 configured to, at a compensation stage, adjust a common electrode voltage applied to each scanned common electrode block into the compensated common electrode voltage acquired by the compensated common electrode voltage calculation circuit 52. The compensation stage may be an $N^{th}$ display time period subsequent to the touch time period, where N is a positive integer. The spacing stage may be a time period between a time point where the capacitance of each scanned common electrode block has been detected and a time point where the compensation stage starts.

According to the voltage compensation device in the embodiments of the present disclosure, the capacitance detection circuit 51 may detect the capacitance of each of the scanned common electrode blocks in at least one column within the touch time period (each common electrode block may be multiplexed as a mutually-capacitive touch electrode), the compensated common electrode voltage calculation circuit 52 may calculate the compensated common electrode voltage in accordance with the capacitance, and then the compensation circuit 53 may compensate the common electrode voltage at the compensation stage (i.e., the display time period subsequent to the touch time period). As a result, it is able to prevent the occurrence of display defects.

To be specific, N may be 1, and the $N^{th}$ display time period may be a display time period immediately subsequent to the touch time period; or N may be 2, and the $N^{th}$ display time period may be a second display time period subsequent to the touch time period; or N may be 3, and the $N^{th}$ display time period may be a third display time period subsequent to the touch time period.

To be specific, the compensation circuit is further configured to, within a display time period between the compensation stage and a next compensation stage, maintain the common electrode voltage applied to each scanned common electrode block as the compensated common electrode voltage.

Figure 6:
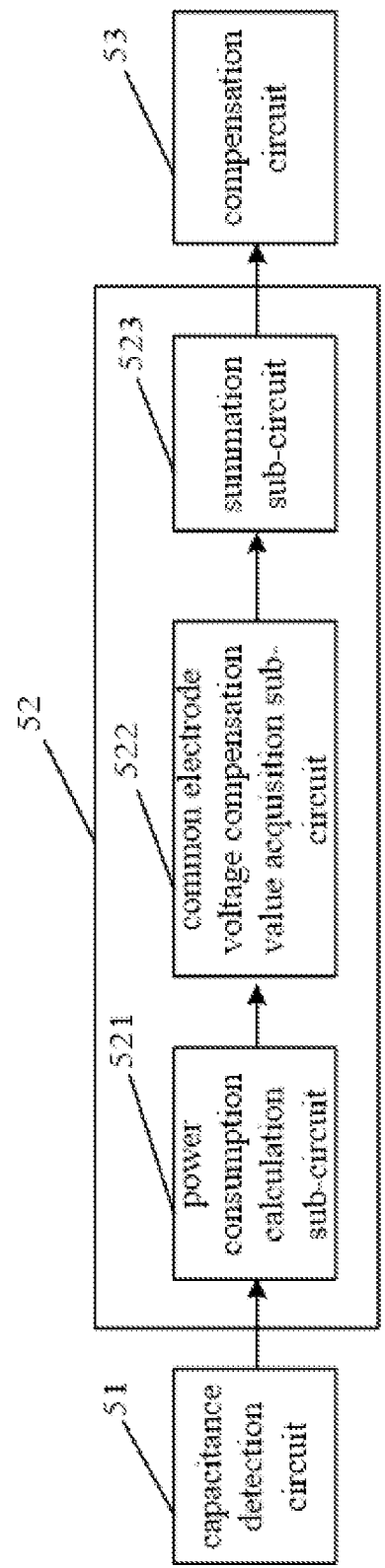
FIG. 6 is another schematic view showing the voltage compensation device according to one embodiment of the present disclosure.

During the implementation, as shown in FIG. 6, the compensated common electrode voltage calculation circuit 52 may include: a power consumption calculation sub-circuit 521 configured to calculate the power consumption for each scanned common electrode block in accordance with the capacitance detected by the capacitance detection circuit 51; a common electrode voltage compensation value acquisition sub-circuit 522 configured to acquire the corresponding common electrode voltage compensation value in accordance with the power consumption calculated by the power consumption calculation sub-circuit 521; and a summation sub-circuit 523 configured to add the common electrode voltage compensation value acquired by the common electrode voltage compensation value acquisition sub-circuit 522 to the predetermined reference common electrode voltage to acquire the compensated common electrode voltage.

During the implementation, the power consumption calculation sub-circuit 521 is further configured to calculate the power consumption for each scanned common electrode block through a formula $P=CUs^2$, where P represents the power consumption for the scanned common electrode block, C represents the capacitance of the scanned common electrode block, and Us represents an initial common electrode voltage applied to the scanned common electrode block within a display time period before the compensation stage.

In actual use, the capacitance detection circuit 51 may transmit the detected capacitance of each scanned common electrode block to the power consumption calculation sub-circuit 521. The power consumption calculation sub-circuit 521 may calculate the power consumption for the common electrode block through the above-mentioned formula in accordance with the capacitance and Us, perform analog-to-digital conversion on the power consumption, and transmit the converted power consumption to a Central Processing Unit (CPU) of a TDDI product. The common electrode voltage compensation value acquisition sub-circuit 522 and the summation sub-circuit 523 may be arranged in the CPU. The common electrode voltage compensation value acquisition sub-circuit 522 is configured to acquire the corresponding common electrode voltage compensation value in accordance with the power consumption. The summation sub-circuit 523 may add the common electrode voltage compensation value to the predetermined reference common electrode voltage so as to acquire the compensated common electrode voltage. A digital-to-analog conversion circuit may then perform digital-to-analog conversion on the compensated common electrode voltage, and output it to the corresponding common electrode block.

In actual use, the common electrode voltage compensation value acquisition sub-circuit 522 is further configured to acquire a table indicating a predetermined correspondence between the power consumption P and the common electrode voltage compensation values ΔVCOM, and acquire the corresponding common electrode voltage compensation value in the table in accordance with the power consumption.

The table may be used to indicate a mapping relationship between the power consumption P for each common electrode block and the common electrode voltage compensation values ΔVCOM. For example, when the power consumption P for each common electrode block is smaller than first power consumption $P_1$, ΔVCOM may be a first voltage compensation value $V_1$; when P is greater than or equal to $P_1$ and smaller than or equal to second power consumption $P_2$, ΔVCOM may be a second voltage compensation value $V_2$; when P is greater than or equal to $(n-1)^{th}$ power consumption $P_{n-1}$ and smaller than or equal to $n^{th}$ power consumption $P_n$, ΔVCOM may be an $n^{th}$ voltage compensation value $V_n$; and when P is greater than $P_n$, ΔVCOM may be an $(n+1)^{th}$ voltage compensation value $V_{n+1}$, where n is a positive integer.

The corresponding table may be shown as follows.

| P | $<P_1$ | $P_1 \leq P \leq P_2$ | ... | $P_{n-1} \leq P \leq P_n$ | $P > P_n$ |
|---|---|---|---|---|---|
| ΔVCOM | $V_1$ | $V_2$ | | $V_n$ | $V_{n+1}$ |

During the implementation, the voltage compensation device may further include a table generation circuit.

The table generation circuit may include a common electrode voltage application sub-circuit, an average brightness acquisition sub-circuit, a brightness comparison sub-circuit and a correspondence recording sub-circuit.

The common electrode voltage application sub-circuit is configured to, within a testing period, apply the reference common electrode voltage to all the common electrode blocks of the touch display module.

The average brightness acquisition sub-circuit is configured to, within the testing period, detect a display region average brightness value for the common electrode blocks in at least one column at a predetermined grayscale.

The brightness comparison sub-circuit is connected to the average brightness calculation sub-circuit and configured to, within the testing period of the touch display module, compare the display region average brightness value for the common electrode blocks in at least one column with a standard brightness value, transmit a voltage adjustment signal to the common electrode voltage application sub-circuit when a difference between the display region average brightness value for the common electrode blocks in at least one column and the standard brightness value is greater than a predetermined brightness threshold, so as to enable the common electrode voltage application sub-circuit, upon the receipt of the voltage adjustment signal, increment or decrement the common electrode voltage applied to each of the common electrode blocks in at least one column by a step voltage value until the difference between the display region average brightness value for the common electrode blocks in at least one column and the standard brightness value is smaller than or equal to the predetermined brightness threshold, and transmit a recording control signal to the corresponding correspondence recording sub-circuit.

The correspondence recording sub-circuit is connected to the brightness comparison sub-circuit, and configured to, within the testing period and upon the receipt of the recording control signal, record the common electrode voltage compensation value corresponding to the common electrode blocks in at least one column, apply a touch scanning signal to the common electrode blocks in at least one column to detect a capacitance of one of the common electrode blocks in at least one column, calculate the power consumption for the common electrode block in accordance with the capacitance, and record a mapping relationship between the power consumption and the common electrode voltage compensation value, so as to generate the table.

In actual use, a common electrode voltage in the table initially used may be the reference common electrode voltage. A touch display panel may be divided into a plurality of display regions, and each display region may correspond to the common electrode blocks in at least one column of the touch display module. An average brightness value of each display region of the touch display panel may be tested through an optical testing device. The common electrode voltage applied to the common electrode block at a display region with uneven brightness may be incremented or decremented by a step voltage value, until the display region average brightness value for the display region meets the requirement. In actual use, the step voltage value may be 0.0025V, and the reference common electrode voltage may be −0.25V.

In actual use, the table (which is used to indicate a mapping relationship between the power consumption P for the common electrode blocks and the common electrode voltage compensation values ΔVCOM) may be acquired in, but not limited to, the following modes.

In a possible embodiment of the present disclosure, the table may be stored in an external server (to be specific, when the touch display module may be a mobile phone, the external server may be a mainboard system of the mobile terminal). The compensated common electrode voltage calculation circuit may further include a table adjustment sub-circuit connected to the external server, and configured to, upon the receipt of table modification information (which may be inputted by a user), acquire the table from the external server, modify the table in accordance with the table modification information to acquire a modified table, transmit the modified table to the external server, and update the table stored in the external server as the modified table.

In actual use, the table stored in the external server may include a first table corresponding to a normal-temperature state and a second table corresponding to a low-temperature state.

The compensated common electrode voltage calculation circuit may further include a temperature acquisition sub-circuit and a temperature determination sub-circuit. The temperature acquisition sub-circuit is configured to acquire an ambient temperature of the touch display module. The temperature determination sub-circuit is configured to compare the ambient temperature with a temperature threshold (which may be set according to the practical need, e.g., −10° C.), transmit a first control signal to the common electrode voltage compensation value acquisition sub-circuit when the ambient temperature is greater than or equal to the temperature threshold, and transmit a second control signal to the common electrode voltage compensation value acquisition sub-circuit when the ambient temperature is smaller than the temperature threshold. The common electrode voltage compensation value acquisition sub-circuit is further configured to acquire the first table upon the receipt of the first control signal, and acquire the second table upon the receipt of the second control signal.

In the embodiments of the present disclosure, the table acquired as mentioned above may be modified after Mura in a vertical direction is determined through human eyes or instrument. In addition, a load of a transmission line is seriously affected by the ambient temperature. When the ambient temperature is a low temperature, the temperature determination sub-circuit may determine that the touch display module is in the low-temperature state, and the second table may be selected, so as to optimize a display effect.

During the implementation, when the touch display module is a mobile terminal, the table may be stored in a mobile phone platform and modified in real time through a code of the mobile terminal. When the mobile phone is powered on each time, the table may be directly loaded into an IC for use. When the mobile phone is at a low level, it may determine that it is in the low-temperature state, and the second table may be selected.

In another possible embodiment of the present disclosure, the table may be arranged in an internal register of the driving IC of the touch display module. Identically, the table may include a first table corresponding to the normal-temperature state and a second table corresponding to the low-temperature state.

The compensated common electrode voltage calculation circuit may further include a temperature acquisition sub-circuit and a temperature determination sub-circuit. The temperature acquisition sub-circuit is configured to acquire an ambient temperature of the touch display module. The temperature determination sub-circuit is configured to compare the ambient temperature with a temperature threshold (which may be set according to the practical need, e.g., −10° C.), transmit a first control signal to the common electrode voltage compensation value acquisition sub-circuit when the ambient temperature is greater than or equal to the temperature threshold, and transmit a second control signal to the common electrode voltage compensation value acquisition sub-circuit when the ambient temperature is smaller than the temperature threshold. The common electrode voltage compensation value acquisition sub-circuit is further configured to acquire the first table upon the receipt of the first control signal, and acquire the second table upon the receipt of the second control signal.

In the embodiments of the present disclosure, after the touch display module is powered on, the temperature acquisition sub-circuit may determine the ambient temperature. The temperature determination sub-circuit may determine whether the touch display module is in the normal-temperature state or the low-temperature state, and select the corresponding table in accordance with a determination result. The corresponding table may be written by a manufacturer of the touch display module into the IC in accordance with different loads of film-forming resistors, so as to control a level of Mura in the vertical direction, thereby to improve the image quality.

During the implementation, the voltage compensation device may further include a temperature detector (e.g., a thermometer) configured to detect the ambient temperature of the touch display module. The temperature acquisition sub-circuit is further configured to acquire the ambient temperature from the temperature detector.

In a possible embodiment of the present disclosure, the quantity of the first tables corresponding to the normal-temperature state may be one.

In another possible embodiment of the present disclosure, the quantity of the first tables corresponding to the normal-temperature state may be at least two, and each first table may correspond to one normal temperature range, so as to further optimize a compensation effect.

For example, when the temperature threshold is −10° C., the quantity of the first tables may be three. A first one of the three first tables may correspond to a first normal temperature range, a second one of the three first tables may correspond to a second normal temperature range, and a third one of the three first tables may correspond to a third normal temperature range. The first normal temperature range may be greater than or equal to −10° C. and smaller than 0° C., the second normal temperature range may be greater than or equal to 0° C. and smaller than 15° C., and the third normal temperature range may be greater than or equal to 15° C.

In a possible embodiment of the present disclosure, the quantity of the second tables corresponding to the low-temperature state may be one.

In another possible embodiment of the present disclosure, the quantity of the second tables corresponding to the normal-temperature state may be at least two, and each second table may correspond to one low temperature range, so as to further optimize the compensation effect.

For example, when the temperature threshold is −10° C., the quantity of the second tables may be two. A first one of the two second tables may correspond to a first low temperature range, and a second one of the two second tables may correspond to a second low temperature range. The first low temperature range may be greater than or equal to −30° C. and smaller than −10° C., and the second low temperature range may be greater than or equal to −10° C. and smaller than or equal to 15° C.

The present disclosure further provides in some embodiments a touch display module including a common electrode layer. The common electrode layer includes a plurality of common electrode blocks arranged independent of each other in an array form (as shown in FIG. 2). The plurality of common electrode blocks is multiplexed as touch electrodes respectively. The touch display module may further include the above-mentioned voltage compensation device. The voltage compensation device is configured to apply a compensated common electrode voltage to each common electrode block.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A voltage compensation method, comprising:
   within a touch time period, enabling a plurality of common electrode blocks arranged independent of each other in an array form to be multiplexed as touch electrodes respectively, and scanning common electrode blocks in at least one column sequentially to detect a capacitance of each scanned common electrode block;
   within a time period between a time point where the capacitance of each scanned common electrode block has been detected and a time point where an $N^{th}$ display time period after the touch time period starts, calculating power consumption for each scanned common electrode block in accordance with the capacitance of each scanned common electrode block, acquiring a corresponding common electrode voltage compensation value in accordance with the power consumption for each scanned common electrode block, and adding the common electrode voltage compensation value to a reference common electrode voltage to acquire a compensated common electrode voltage applied to each scanned common electrode block, N being a positive integer; and
   within the $N^{th}$ display time period, adjusting a common electrode voltage applied to each scanned common electrode block into the compensated common electrode voltage applied to each scanned common electrode block.

2. The voltage compensation method according to claim 1, wherein the calculating the power consumption for each scanned common electrode block in accordance with the capacitance of each scanned common electrode block comprises calculating the power consumption for each scanned common electrode block through a formula $P=CU_s^2$, where P represents the power consumption for the scanned common electrode block, C represents the capacitance of the scanned common electrode block, and $U_s$ represents an initial common electrode voltage applied to the scanned common electrode block within a display time period before the $N^{th}$ display time period.

3. The voltage compensation method according to claim 2, wherein the acquiring the corresponding common electrode voltage compensation value in accordance with the power consumption for each scanned common electrode block comprises:
   acquiring a table indicating a correspondence between the power consumption and the common electrode voltage compensation values; and
   acquiring the corresponding common electrode voltage compensation value in the table in accordance with the power consumption for each scanned common electrode block.

4. The voltage compensation method according to claim 2, wherein subsequent to adjusting the common electrode voltage applied to each scanned common electrode block into the compensated common electrode voltage within the $N^{th}$ display time period, the voltage compensation method further comprises, within a display time period between the $N^{th}$ display time period and an Nth display time period after a next touch time period adjacent to the touch time period, maintaining the common electrode voltage applied to each scanned common electrode block as the compensated common electrode voltage.

5. The Voltage compensation method according to claim 1, wherein the acquiring the corresponding common electrode voltage compensation value in accordance with the power consumption for each scanned common electrode block comprises:
   acquiring a table indicating a correspondence between the power consumption and the common electrode voltage compensation values; and
   acquiring the corresponding common electrode voltage compensation value in the table in accordance with the power consumption for each scanned common electrode block.

6. The voltage compensation method according to claim 5, further comprising:
   within a testing period, applying the reference common electrode voltage to all the common electrode blocks, and detecting a display region average brightness value for the common electrode blocks in at least one column at a testing grayscale;
   comparing the display region average brightness value for the common electrode blocks in at least one column with a standard brightness value, and when a difference between the display region average brightness value for the common electrode blocks in at least one column and the standard brightness value is greater than a brightness threshold, incrementing or decrementing the common electrode voltage applied to each of the common electrode blocks in at least one column by a step voltage value, until the difference between the display region average brightness value for the common electrode blocks in at least one column and the standard brightness value is smaller than or equal to the brightness threshold; and
   recording the common electrode voltage compensation value corresponding to the common electrode blocks in at least one column, applying a touch scanning signal to the common electrode blocks in at least one column to detect a capacitance of one of the common electrode blocks in at least one column, calculating the power consumption for the common electrode block in accordance with the capacitance, and recording a mapping relationship between the power consumption and the common electrode voltage compensation value, so as to generate the table.

7. The voltage compensation method according to claim 5, wherein the table is stored in an external server, and the acquiring the corresponding common electrode voltage compensation value in accordance with the power consumption for each scanned common electrode block further comprises, upon the receipt of table modification information, acquiring the table from the external server, modifying the table in accordance with the table modification information to acquire a modified table, and transmitting the modified table to the external server, so as to update the table stored in the external server as the modified table.

8. The voltage compensation method according to claim 5, wherein the table comprises a first table and a second table,
wherein the acquiring the table indicating the correspondence between the power consumption and the common electrode voltage compensation values comprises:
acquiring an ambient temperature; and
comparing the ambient temperature with a temperature threshold, acquiring the first table when the ambient temperature is greater than or equal to the temperature threshold, and acquiring the second table when the ambient temperature is smaller than the temperature threshold.

9. The voltage compensation method according to claim 1, wherein subsequent to adjusting the common electrode voltage applied to each scanned common electrode block into the compensated common electrode voltage within the $N^{th}$ display time period, the voltage compensation method further comprises, within a display time period between the $N^{th}$ display time period and an Nth display time period after a next touch time period adjacent to the touch time period, maintaining the common electrode voltage applied to each scanned common electrode block as the compensated common electrode voltage.

10. A voltage compensation device, comprising:
a touch circuit configured to, within a touch time period, enable a plurality of common electrode blocks arranged independent of each other in an array form to be multiplexed as touch electrodes respectively, and scan common electrode blocks in at least one column sequentially;
a capacitance detection circuit configured to detect a capacitance of each scanned common electrode block;
a compensated common electrode voltage calculation circuit configured to, within a time period between a time point where the capacitance of each scanned common electrode block has been detected and a time point where an $N^{th}$ display time period after the touch time period starts, calculate power consumption for each scanned common electrode block in accordance with the capacitance of each scanned common electrode block, acquire a corresponding common electrode voltage compensation value in accordance with the power consumption for each scanned common electrode block, and add the common electrode voltage compensation value to a reference common electrode voltage to acquire a compensated common electrode voltage applied to each scanned common electrode block, N being a positive integer; and
a compensation circuit configured to, within the $N^{th}$ display time period, adjust a common electrode voltage applied to each scanned common electrode block into the compensated common electrode voltage applied to each scanned common electrode block.

11. The voltage compensation device according to claim 10, wherein the compensated common electrode voltage calculation circuit comprises:
a power consumption calculation sub-circuit configured to calculate the power consumption for each scanned common electrode block in accordance with the capacitance of each scanned common electrode block;
a common electrode voltage compensation value acquisition sub-circuit configured to acquire the corresponding common electrode voltage compensation value in accordance with the power consumption for each scanned common electrode block; and
a summation sub-circuit configured to add the common electrode voltage compensation value to the reference common electrode voltage to acquire the compensated common electrode voltage applied to each scanned common electrode block.

12. The voltage compensation device according to claim 11, wherein the power consumption calculation sub-circuit is further configured to calculate the power consumption for each scanned common electrode block through a formula $P=CU_s^2$, where P represents the power consumption for the scanned common electrode block, C represents the capacitance of the scanned common electrode block, and Us represents an initial common electrode voltage applied to the scanned common electrode block within a display time period before the $N^{th}$ display time period.

13. The voltage compensation device according to claim 12, wherein the common electrode voltage compensation value acquisition sub-circuit is further configured to acquire a table indicating a correspondence between the power consumption and the common electrode voltage compensation values, and acquire the corresponding common electrode voltage compensation value in the table in accordance with the power consumption for each scanned common electrode block.

14. The voltage compensation device according to claim 11, wherein the common electrode voltage compensation value acquisition sub-circuit is further configured to acquire a table indicating a correspondence between the power consumption and the common electrode voltage compensation values, and acquire the corresponding common electrode voltage compensation value in the table in accordance with the power consumption for each scanned common electrode block.

15. The voltage compensation device according to claim 14, further comprising a table generation circuit,
wherein the table generation circuit comprises a common electrode voltage application sub-circuit, an average brightness acquisition sub-circuit, a brightness comparison sub-circuit and a correspondence recording sub-circuit;
the common electrode voltage application sub-circuit is configured to, within a testing period, apply the reference common electrode voltage to all the common electrode blocks;
the average brightness acquisition sub-circuit is configured to, within the testing period, detect a display region average brightness value for the common electrode blocks in at least one column at a testing grayscale;

the brightness comparison sub-circuit is connected to the average brightness calculation sub-circuit and configured to, within the testing period, compare the display region average brightness value for the common electrode blocks in at least one column with a standard brightness value, transmit a voltage adjustment signal to the common electrode voltage application sub-circuit when a difference between the display region average brightness value for the common electrode blocks in at least one column and the standard brightness value is greater than a brightness threshold, so as to enable the common electrode voltage application sub-circuit, upon the receipt of the voltage adjustment signal, increment or decrement the common electrode voltage applied to each of the common electrode blocks in at least one column by a step voltage value until the difference between the display region average brightness value for the common electrode blocks in at least one column and the standard brightness value is smaller than or equal to the brightness threshold, and transmit a recording control signal to the corresponding recording sub-circuit; and the correspondence recording sub-circuit is connected to the brightness comparison sub-circuit, and configured to, within the testing period and upon the receipt of the recording control signal, record the common electrode voltage compensation value corresponding to the common electrode blocks in at least one column, apply a touch scanning signal to the common electrode blocks in at least one column to detect a capacitance of one of the common electrode blocks in at least one column, calculate the power consumption for the common electrode block in accordance with the capacitance, and record a mapping relationship between the power consumption and the common electrode voltage compensation value, so as to generate the table.

16. The voltage compensation device according to claim 14, wherein the table is stored in an external server, wherein the compensated common electrode voltage calculation circuit further comprises a table adjustment sub-circuit connected to the external server, and configured to, upon the receipt of table modification information, acquire the table from the external server, modify the table in accordance with the table modification information to acquire a modified table, transmit the modified table to the external server, and update the table stored in the external server as the modified table.

17. The voltage compensation device according to claim 14, wherein the table comprises a first table and a second table;

the compensated common electrode voltage calculation circuit further comprises a temperature acquisition sub-circuit and a temperature determination sub-circuit;

the temperature acquisition sub-circuit is configured to acquire an ambient temperature;

the temperature determination sub-circuit is connected to the temperature acquisition sub-circuit and the common electrode voltage compensation value acquisition sub-circuit, and configured to compare the ambient temperature with a temperature threshold, transmit a first control signal to the common electrode voltage compensation value acquisition sub-circuit when the ambient temperature is greater than or equal to the temperature threshold, and transmit a second control signal to the common electrode voltage compensation value acquisition sub-circuit when the ambient temperature is smaller than the temperature threshold; and the common electrode voltage compensation value acquisition sub-circuit is further configured to acquire the first table upon the receipt of the first control signal, and acquire the second table upon the receipt of the second control signal.

18. The voltage compensation device according to claim 14, further comprising a temperature detector configured to detect the ambient temperature, wherein the temperature acquisition sub-circuit is further configured to acquire the ambient temperature from the temperature detector.

19. The voltage compensation device according to claim 11, wherein the compensation circuit is further configured to, within a display time period between the $N^{th}$ display time period and an Nth display time period after a next touch time period adjacent to the touch time period, maintain the common electrode voltage applied to each scanned common electrode block as the compensated common electrode voltage.

20. A touch display module, comprising a common electrode layer and the voltage compensation device according to claim 10, wherein the common electrode layer comprises a plurality of common electrode blocks arranged independent of each other in an array form, the plurality of common electrode blocks is multiplexed as touch electrodes respectively, and the voltage compensation device is configured to apply a compensated common electrode voltage to each common electrode block.

\* \* \* \* \*